US006641926B1

(12) United States Patent
Malina et al.

(10) Patent No.: US 6,641,926 B1
(45) Date of Patent: Nov. 4, 2003

(54) LIQUID RESISTANT LAMINATE WITH STRONG BACKER

(75) Inventors: Jerry L. Malina, Temple, TX (US); Victoria Lynn Stolarski, Austin, TX (US); Joel Lane Williams, Troy, TX (US); Donald Murray Marshall, Temple, TX (US); Timothy J. Lay, Belton, TX (US)

(73) Assignee: Premark RWP Holdings, Inc., Wilmington, DE (US)

( * ) Notice: Subject to any disclaimer, the term of this patent is extended or adjusted under 35 U.S.C. 154(b) by 0 days.

(21) Appl. No.: 09/374,499

(22) Filed: Aug. 13, 1999

(51) Int. Cl.$^7$ ................................................ B32B 27/42
(52) U.S. Cl. .................... 428/524; 428/526; 428/530; 428/537.5; 428/542.2
(58) Field of Search .......................... 428/537.5, 526, 428/524, 530, 542.2

(56) References Cited

U.S. PATENT DOCUMENTS

| | | | |
|---|---|---|---|
| 4,001,154 A | 1/1977 | Schmidt | 524/548 |
| 4,141,872 A | 2/1979 | Bunkowski | 524/140 |
| 4,585,605 A | 4/1986 | Kadota et al. | 264/51 |
| 4,636,443 A | 1/1987 | Jaisle et al. | 428/481 |
| 4,724,187 A | 2/1988 | Ungar et al. | 428/408 |
| 4,788,088 A | 11/1988 | Kohl | 428/34.5 |
| 4,798,750 A | 1/1989 | Kersting | 428/36.7 |
| 5,059,580 A | 10/1991 | Shibata et al. | 503/227 |
| RE33,838 E | 3/1992 | Jaisle et al. | 428/481 |
| 5,137,764 A | 8/1992 | Doyle et al. | 428/44 |
| 5,145,748 A | 9/1992 | Gaidis et al. | 428/489 |
| 5,187,915 A | 2/1993 | Alexander | 52/741 |
| 5,266,384 A | 11/1993 | O'Dell et al. | 428/207 |
| 5,352,510 A | 10/1994 | Laughlin et al. | 428/304.4 |
| 5,439,749 A | * 8/1995 | Klasell et al. | 428/537.1 |
| 5,558,906 A | 9/1996 | Albrinck et al. | 427/180 |
| 5,989,668 A | * 11/1999 | Nelson et al. | 428/50 |

FOREIGN PATENT DOCUMENTS

| | | |
|---|---|---|
| DE | 1902224 | 8/1970 |
| EP | 0015316 | 9/1980 |
| EP | 0146519 | 6/1985 |
| EP | 0238472 | 9/1987 |
| EP | 0 523 644 A1 | 1/1993 |
| EP | 0733756 A3 | 3/1996 |
| EP | 0733756 A2 | 9/1996 |
| EP | 919367 | 6/1999 |
| EP | 1008440 A2 | 6/2000 |
| EP | 1018423 A1 | 7/2000 |
| JP | 47011677 | 4/1972 |
| JP | 2-125735 | 5/1990 |
| JP | 2-150483 A | 6/1990 |
| JP | 5-220906 A | 8/1993 |
| JP | 5-279530 A | 10/1993 |
| JP | 6-279546 A | 10/1994 |
| JP | 08224705 | 9/1996 |
| WO | 9850207 | 11/1998 |

OTHER PUBLICATIONS

European Patent Office Search Report (Application EP 00 11 4918) dated Nov. 21, 2000.
Abstract of CA 1140443A, Database WPI Section CH, Week(1983)12, Derwent Publications Ltd. XP002152407, 12, 1983.
European Search Report dated May 26, 2000.
Singapore Search Report "," Dated Sep. 10, 2001 Submitted in an Office Action Dated Jan. 11, 2002.

* cited by examiner

Primary Examiner—Leszek Kiliman
(74) Attorney, Agent, or Firm—Fulbright & Jaworski L.L.P.

(57) ABSTRACT

A laminate panel having desired characteristics even though the materials having these desired characteristics are not compatible in at least one aspect is disclosed. One of the substances having the desired characteristics may be adapted to be compatible with the other substance, and the two substances placed adjacent to each other. For example, the laminate panel includes a liquid impermeable layer that substantially prevents the penetration of moisture. The panel also includes a layer of a balancing substance disposed adjacent to the liquid impermeable layer to balance another layer of the laminate panel. The balancing substance is adapted to provide a desired bonding between the liquid impermeable layer and the layer of the balancing substance.

56 Claims, 3 Drawing Sheets

|  | FLOOR 1 | | | FLOOR 2 | | |
|---|---|---|---|---|---|---|
| PLANK | INSTALLED (IN INCHES) | WET (IN INCHES) | DRY (IN INCHES) | INSTALLED (IN INCHES) | WET (IN INCHES) | DRY (IN INCHES) |
| A | −0.007 | −0.013 | 0.000 | −0.018 | −0.024 | 0.000 |
| B | 0.000 | −0.007 | 0.009 | −0.014 | −0.022 | 0.002 |
| C | 0.001 | −0.005 | 0.008 | −0.023 | −0.031 | −0.004 |
| D | −0.006 | −0.014 | 0.001 | −0.020 | −0.029 | −0.011 |
| E | −0.003 | −0.011 | 0.006 | −0.006 | −0.010 | 0.003 |
| F | −0.002 | −0.009 | 0.006 | −0.010 | −0.018 | −0.002 |
| G | −0.003 | −0.012 | 0.006 | −0.013 | −0.023 | −0.007 |
| H | −0.003 | −0.012 | 0.006 | −0.017 | −0.025 | −0.009 |
| I | −0.010 | −0.017 | 0.000 | −0.016 | −0.026 | −0.008 |
| AVERAGE | −0.004 | −0.011 | 0.005 | −0.015 | −0.023 | −0.004 |

*FIG. 8*

LIQUID RESISTANT LAMINATE WITH STRONG BACKER

RELATED APPLICATIONS

The present application is related to co-pending and commonly assigned U.S. patent application Ser. No. 09/173, 065, entitled "WATERPROOF LAMINATE PANEL", filed Oct. 16, 1998, now U.S. Pat. No. 5,989,668, issued Nov. 23, 1999, which is incorporated herein by reference. Reference is hereby made to the following co-pending, commonly assigned, U.S. patent applications: Ser. No. 09/267,493, entitled "SYSTEM AND METHOD FOR TWO SIDED SHEET TREATING", filed Mar. 12, 1999; now pending Ser. No. 09/249,033, entitled "PIGMENTED BACKER FILM AND METHOD OF PRODUCTION", filed Feb. 11, 1999, now abandoned; Ser. No. 09/226,572, entitled "SYSTEM AND METHOD FOR ADHERING LAMINATE TO AN ALTERNATE SUBSTRATE MATERIAL", filed Jan. 7, 1999, now abandoned; Ser. No. 09/294,723, entitled "LAMINATE EMPLOYING LIQUID RESISTANT FILM AND TWO SIDED SHEET", filed Apr. 19, 1999, now abandoned; Ser. No. 08/978,026, entitled "POLYMERIC FOAM SUBSTRATE AND ITS USE IN COMBINATION WITH DECORATIVE SURFACES", filed Nov. 25, 1997, now U.S. Pat. No. 6,139,945, issued Oct. 31, 2000; Ser. No. 09/161,270, entitled "POLYMERIC FOAM COMPOSITIONS AND METHOD OF MAKING, SUBSTRATES MADE FROM SUCH COMPOSITIONS AND METHOD OF MAKING, PRODUCTS MADE FROM SUCH SUBSTRATES AND METHOD OF MAKING", filed Sep. 26, 1998, now abandoned; and Ser. No. 09/363,466, entitled "SYSTEM AND METHOD FOR PRODUCING A LAMINATE EMPLOYING A PLASTIC FILM", filed Jul. 29, 1999, now abandoned; the disclosures of which are incorporated herein by reference.

TECHNICAL FIELD

The present invention relates generally to the manufacture of laminated products such as may be used for flooring, counter tops, table tops, and wall panels, and more specifically to systems and methods for manufacturing such products to include a liquid resistant film and another laminate material providing a desired balancing characteristic to the laminated product.

BACKGROUND

The ability to replicate natural materials has substantially improved over the years. For example, decorative laminates have replaced natural materials in the construction of furniture, cabinets, counter tops, flooring and other surfaces. In each of these applications, a decorative surface may be applied to a core layer or substrate, namely, plywood, particle board, chipboard, hardboard, wood waste, medium density fiberboard, high density fiberboard, inert mineral board, sheet rock, plaster board and other substances. The core layer or substrate may also be made of Alternate Substrate Materials (ASM). Such ASM may include non-wood cores or substrates, such as synthetic or non-cellulose substrate material, for example, recycled plastic substrates, ABS/PC, nylon, PVC, or the like. However, a core or substrate is not included with all laminate products.

Often, a backing layer is secured to the opposite side of the substrate to balance the movement of the decorative surface or provide other benefits. It is well known in the art that traditional high pressure laminates expand or contract with an increase or decrease in the environmental humidity. Moreover, it is also known that prolonged exposure of the flooring composite, made of laminates bound to a wood-based substrate, to liquids, for example water, such as by flooding through the sub-floor, adversely effects not only traditionally constructed laminates, but also the substrate, such as by causing swelling, peaking or blistering.

Generally the decorative surface of a laminate composite, such as a laminate flooring, is designed as shown in FIG. 1. A high pressure laminate 10 may be comprised of a thin aluminum oxide incorporated overlay sheet 11 impregnated with a protective substance, such as melamine resin, which provides color fastness, hardness, chemical resistance, and also resistance to brief exposure to water. The high pressure laminate 10 may employ a decorative sheet 12 disposed under overlay sheet 11, which may be a melamine treated sheet, and sheets 13 and 14 of kraft paper impregnated with phenolic resin disposed below the decorative sheet.

Traditionally, the backing layer is similarly designed. As shown in FIG. 1, the backing layer of a decorative high pressure laminate 10 may comprise two sheets 16 and 17 of kraft paper impregnated with phenolic resin disposed below substrate 15, and a balancing layer 18 of an overlay paper impregnated with a protective substance disposed below the kraft paper sheets 16 and 17 to balance the overlay sheet 11 of the decorative side. In flooring laminates such protective substance may be a melamine resin. Typically both the backing layer and the decorative layer are bonded to substrate 15 by using a suitable adhesive.

As those of ordinary skill in the art will appreciate, the decorative and backing layers discussed above are purely exemplary and not intended to limit the description of the present invention to the above discussed structures.

After installation, such as by gluing several pieces of laminate flooring together at the seams, the decorative laminate is subject to a different environment than the backer laminate. That is, the exposed decorative laminate experiences temperature and humidity fluctuations of the room environment. In contrast, the backer laminate, is exposed to temperature and moisture changes of the sub-floor over which the laminate flooring is applied. Moreover, prolonged exposure of the backer laminate to liquids, for example water, such as by moisture penetration through the sub-floor, adversely effects not only the backer laminate but also the substrate. The traditional flooring panels are, however, not designed or otherwise properly adapted to compensate for the difference between the environments to which the decorative and backer laminates are exposed.

One inventive solution to prevent the penetration of moisture, such as water vapor or humidity into the backer layer, is to use a layer that is liquid impermeable, such as a styrenemaleic anhydride copolymer layer, at the bottom of the backing layer to substantially prevent the penetration of moisture, such as water, in liquid form. This inventive solution is disclosed in detail in the above referenced U.S. Patent Application, entitled "LAMINATE".

Although the incorporation of the liquid impermeable layer into the backer of the laminate flooring in accordance with a preferred embodiment of U.S. Patent Application, entitled "LAMINATE" provides a significant improvement in the resistance of the entire composite to standing water, the sensitivity of the decorative laminate to conditions of low humidity has been discovered to increase, as in the preferred embodiment disclosed therein the melamine balancing layer 18 in the backer laminate is replaced with a liquid impermeable layer. Thus, the movement of the melamine layer 11 of the decorative side in conditions of low humidity may cause the flooring panel to warp without resistance as the liquid impermeable layer does not inflict an equal and opposite shrinkage and thus the lateral edges of the panel point in an upward direction (positive warpage). Such positive warpage of the flooring panel is visually obtrusive and often times necessitates replacement of the entire floor. The backer laminate as described in the preferred embodiment in the above referenced U.S. Patent Application, entitled "LAMINATE", is comprised of the liquid impermeable layer positioned at an exterior surface of one of several phenolic resin impregnated kraft paper sheets. The melamine treated balancing sheet is not incorporated into the backer laminate described in the preferred embodiment of the above referenced U.S. Patent Application entitled "LAMINATE" as a sufficient bond may not be achieved between the liquid impermeable layer and the melamine layer. Attempts have been made to balance and/or counteract the humidity driven movement of the decorative laminate by increasing the number and weight of the phenolic resin impregnated kraft paper sheets in the backer laminate to yield a strong backer. However, such efforts did not provide a backer strong enough to balance the movement of the decorative laminate when two or more melamine treated sheets were used in the decorative laminate to improve wear resistance.

In the preferred embodiment of the above referenced U.S. Patent Application, entitled "LAMINATE EMPLOYING LIQUID RESISTANT FILM AND TWO SIDED SHEET" a method of incorporating a melamine treated balancing sheet in the backer laminate is described. In the preferred embodiment of the above referenced application, a layer of phenolic resin may be inserted between the liquid impermeable layer and the melamine layer so that both the liquid impermeable layer and the melamine layer may be used in the same laminate to provide the desired liquid impermeable and balancing characteristics. However, in order to properly balance a composite having a particular characteristic material associated with the exterior of the top or decorative laminate, it may be desirable to have the balancing layer close to the bottom exterior of the backer laminate. Thus, when a laminate flooring has a melamine impregnated overlay layer as a top exterior surface of the decorative side, it may be desired to have a balancing layer of melamine close to the bottom exterior of the laminate in order to properly balance the top overlay layer. However, as in the preferred embodiment of the above referenced patent application, entitled "LAMINATE EMPLOYING LIQUID RESISTANT FILM AND TWO SIDED SHEET", the balancing layer is not adjacent to the liquid impermeable layer as a layer of a third substance, such as phenolic resin, is inserted between the liquid impermeable and balancing layers since the liquid impermeable and balancing layers do not readily bond with each other.

Thus, there is a need in the art for a system and method of manufacturing laminates providing the advantages of the melamine balancing layer and also providing the advantages offered by the liquid impermeable layer.

There is a further need in the art for a system and method of manufacturing laminates such that two layers, such as a balancing layer and a liquid impermeable layer, providing desired characteristics may be placed adjacent to each other in a laminate assembly.

SUMMARY OF THE INVENTION

These and other objects, features and technical advantages are achieved by a system and method for adapting a layer having a desired characteristic to be compatible with another layer having a desired characteristic, such that both layers providing desired characteristics may be used adjacent to each other in a laminate panel. For example, a substance in a balancing layer of a laminate composite, such as melamine in a melamine resin impregnated sheet, may be adapted to provide enhanced bonding with a liquid impermeable layer, such as a styrene-maleic anhydride copolymer layer.

Accordingly in an embodiment of the present invention, a balancing sheet, such as a melamine impregnated sheet, is placed adjacent to the layer providing the liquid impermeable characteristics, such as a styrene-maleic anhydride layer. The balancing sheet preferably balances the stress caused from the movement of a protective layer in the decorative laminate and prevents positive warpage of a flooring composite, for example. The styrene-maleic anhydride layer provides another desired characteristic to the composite, such as impermeability to liquids. The melamine impregnated sheet of the preferred embodiment may be adapted to provide a desired bonding with the liquid impermeable sheet. This is specially useful as traditional melamine impregnated sheets do not provide a desired bonding with the liquid impermeable sheet.

Therefore, in this embodiment of the present invention, the melamine layer and the liquid impermeable layer are placed adjacent to each other, and thus both flatness and enhanced liquid resistance may be provided to the composite employing the backer laminate. The order of the sheets in the backer laminate is changed from the traditional laminate design such that the balancing sheet is no longer the outermost layer. However, in this embodiment, the balancing sheet may be placed close to the exterior surface of the laminate to balance a corresponding layer of the decorative side thus providing a desired balancing laminate.

In the preferred embodiment, an adhesion promoting agent, such as silane, is mixed with a substance providing the desired balancing characteristic, such as melamine resin, in a predetermined amount to provide the desired adhesive characteristic to the balancing substance. In the preferred embodiment, the amount of silane added to a melamine resin used for balancing a laminate is between 0.1 to 0.5 percent by weight of the melamine resin. A laminate material may then be treated with the melamine resin, such as by coating, saturating and/or impregnating an overlay sheet with the melamine resin, using conventional methods that are well known in the art, such as by using a Kiss coater or a reverse roll coater. The melamine treated laminate material may be placed adjacent to the liquid impermeable layer and subjected to heat and pressure to cure the resin, as is known in the art, to manufacture the desired laminate having the desired liquid resistant and balancing characteristics with the layers providing the desired characteristics adjacent to each other.

In an alternative embodiment of the present invention, a first side of a laminate material, such as a sheet of kraft paper, may be treated with the melamine resin and silane mixture. The other side of the kraft paper may be treated with melamine, a mixture of melamine and silane, or a substance providing structural characteristics to the laminate, such as phenolic resin. A system and method for manufacturing such a laminate material as well as an outline of the advantages of the double treated sheet, has been disclosed in detail in the above referenced commonly assigned U.S. Patent Application, entitled "SYSTEM AND METHOD FOR TWO SIDED SHEET TREATING". Thus, in this alternative embodiment, such a sheet of kraft paper may be placed adjacent to a layer providing another desired characteristic to the laminate, such as the liquid impermeable layer, with the melamine resin treated surface next to the liquid impermeable layer to thereby dispose the layer providing the desired balancing characteristic adjacent to the layer providing the desired liquid impermeable characteristic. Such a placement of layers positions the melamine resin impregnated sheet close to the exterior of the laminate thereby providing better balancing characteristics to the laminate to substantially prevent positive warpage of the composite.

The different embodiments of the present invention as discussed above provide advantages not available in the prior art. For example, the laminate panel so constructed provides impermeability to liquids, such as water, due to the addition of the liquid impermeable layer, preferably as the outermost layer, and balancing characteristics due to the incorporation of a layer, such as the melamine resin impregnated layer, in the backer laminate, thereby allowing the composite to remain substantially flat over a broader range of temperature and humidity conditions. Moreover in the preferred embodiment discussed above, the balancing substance may be placed close to the exterior surface of the laminate as the balancing melamine layer is separated from the exterior surface of the composite by only the liquid impermeable layer, thereby providing the desired balancing characteristics. In typical laminates, the surface to be balanced, such as the melamine impregnated overlay sheet of the decorative laminate, forms the outermost surface of the decorative laminate. Therefore, it is desirable to have the balancing layer close to the exterior of the backer laminate.

Moreover, a prior art overlay sheet impregnated with the balancing substance allows only a limited amount of the balancing substance, such as melamine, to be used, and thus is not able to resist the pull of the melamine layer of the decorative laminate, especially when more than one layer of melamine resin impregnated sheet is used in the decorative side of the laminate. On the other hand, more melamine resin per unit area of the sheet may be provided to the laminate of the alterative embodiment discussed above, as kraft paper sheet is capable of absorbing more melamine than a traditional overlay sheet used in prior art backer laminates, thereby yielding a stronger backer. Thus, in the alternative embodiment discussed above, the laminate may be saturated with a greater amount of the balancing substance, such as melamine, thereby allowing the laminate to remain flat even in cases where the decorative side uses more than one melamine resin impregnated sheet to provide a desired protective characteristic to the laminate.

Therefore, it is a technical advantage of the present invention to provide a liquid impermeable laminate for use with decorative panels, such as flooring panels.

It is another technical advantage of the present invention to provide a hydrophobic laminate with the desired balancing characteristics to prevent warping of the laminate in extreme conditions.

It is yet another technical advantage of the present invention to provide a laminate with a liquid impermeable layer and a balancing layer disposed adjacent to the liquid impermeable layer.

It is still another technical advantage of the present invention to provide a liquid impermeable flooring laminate with a wood based substrate.

It is still another technical advantage of the present invention to provide a liquid impermeable flooring laminate having a core layer or substrate composed of an Alternate Substrate Material (ASM) and having the desired balancing characteristics.

It is a further technical advantage of the present invention to provide an outermost water resistant flooring laminate with a layer providing desired balancing characteristics disposed adjacent to the outermost water resistant layer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 8 is a table showing the results of experimental testing performed on a flooring panel using the laminate of FIG. 2.

DETAILED DESCRIPTION

Figure 1:
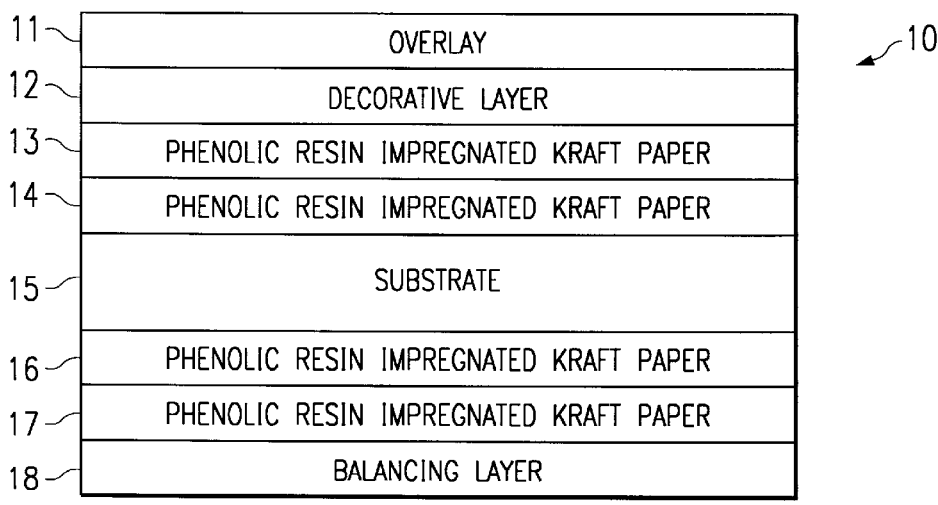
FIG. 1 is a schematic of a prior art laminate panel.
Figure 2:
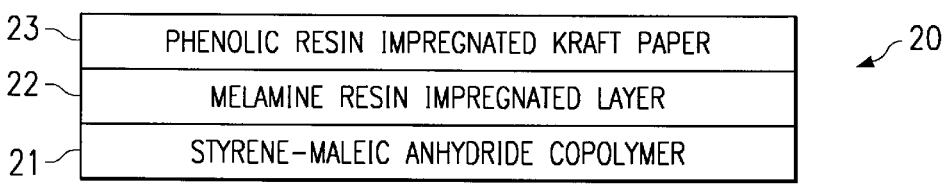
FIG. 2 is a schematic of a backer in accordance with a first embodiment of the present invention.

FIG. 2 shows a schematic of a laminate, for example a backer laminate, in accordance with an embodiment of the present invention. In the embodiment shown in FIG. 2, laminate 20 includes a layer having a desired characteristic, such as a liquid impermeable layer 21, preferably a styrene-maleic anhydride copolymer layer. The styrenemaleic anhydride copolymer is preferably DYLARK® manufactured by NOVA Chemicals, Inc. A laminate material providing another desired characteristic, such as a melamine resin impregnated layer 22, may be disposed adjacent to the liquid impermeable styrene-maleic anhydride copolymer layer 21. The laminate material used in layer 22 may be a traditional overlay sheet. If desired, one or more phenolic resin impregnated kraft paper sheets, such as sheet 23, may be disposed adjacent to the melamine resin impregnated layer 22.

The styrene copolymer is hydrophobic which makes it less permeable to liquids, such as water. Of course, where other materials are utilized in providing the laminate adapted according to the present invention, polymers or unsaturated monomers having other characteristics and/or chemical composition may be utilized to provide impermeability to liquids, such as water, and bonding as described above.

Styrene-maleic anhydride exhibits good thermal stability, in addition to exhibiting outstanding bonding characteristics with phenolic resin impregnated kraft paper. The excellent bonding of styrene-maleic anhydride with phenolic resin is a result of the strong hydrogen bonding between the acid anhydride and the unreacted hydroxyl groups of the phenolic resin, and/or actual chemical crosslinking between those same two sites. However, the styrene-maleic anhydride copolymer does not provide the same desired bonding with melamine resin impregnated layer 22. It is believed that several additives in the melamine resin used for the treating process during manufacture of the laminate, interfere with the hydrogen bonding that could occur between the amine sites and the acid anhydride.

Therefore, in the preferred embodiment, the melamine in the melamine resin impregnated layer 22 is adapted, preferably prior to impregnating the laminate material, in order to provide a desired bonding characteristic to layer 22 to facilitate superior bonding of the melamine impregnated layer 22 with liquid impermeable layer 21. In order to provide the desired bonding characteristic to the melamine resin, a preselected amount of an adhesion promoting agent, such as silane, and a predetermined amount of a balancing substance, such as melamine, may be poured into a mixing vessel. The mixing vessel is preferably provided or associated with a mixing shaft with propellers to disperse the adhesion promoting agent, such as silane, into the melamine. Once the melamine and silane have been mixed, the mixture may be pumped or otherwise transported to a treating area for treating a laminate material, such as an overlay sheet, with the melamine. In the preferred embodiment, the amount of silane in the melamine mixture is between 0.1 to 0.5 percent by weight of the melamine. Preferably, Z-6040 Silane manufactured by Dow Corning® is used for best results, although any type of silane may be used without departing from the spirit of the present invention. The Z-6040 Silane may be designated as a 3-glycidoxypropyltrimethoxysilane.

Silane exhibits good thermal stability, in addition to exhibiting outstanding bonding characteristics with the styrene-maleic anhydride copolymer layer. The excellent bonding characteristics of silane are a result of the hydroxy (OH) groups found on the silane. The hydroxy groups of silane provide bond sites that act as receptors or ties between the styrene-maleic anhydride and the melamine. Thus, the silane in the melamine resin impregnated layer 22 provides bond sites that facilitate the creation of bonds and hence better adhesion between the preferred embodiment styrene-maleic anhydride copolymer layer 21 and the melamine resin impregnated layer 22.

Figure 7:
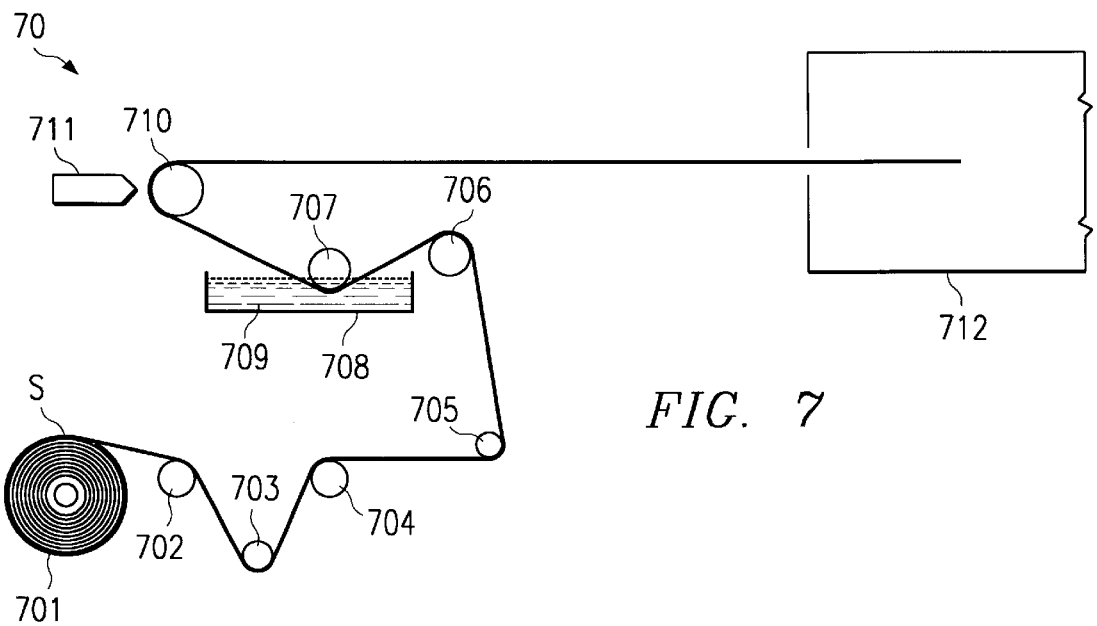
FIG. 7 shows a system for treating a sheet with a substance according to a preferred embodiment of the present invention.

The melamine resin impregnated layer 22 of the preferred embodiment may be treated with melamine by any suitable method. In the preferred embodiment, a conventional kiss roll coater, known to one skilled in the art, may be used to treat the laminate material, such as an overlay sheet. FIG. 7 shows a schematic diagram of a preferred system 70 that may be used for impregnating the overlay sheet with melamine. The system comprises a sheet S in the form of a roll 701, a series of rollers 702, 703, 704, 705, 706, 707, 710, pan 708, metering device 711 and a conditioner 712 such as may be an oven for applying a controlled amount of heat for subsequent curing of a substance. Pan 708 contain substance 709. Metering device 711 controls the amount of substance 709 remaining on sheet S.

Sheet S is unwound and passed along rollers 702, 703, 704, 705, 706, 707, and 710 to curing device 712. Rollers 702, 703, 704, 705, 706, 707 maintain a uniform tension on the surface of sheet S and prevent it from slacking and/or tearing. The tension on sheet S may be varied by adjusting the speed of the rollers and/or the pressure exerted thereon by idler rollers 702, 703, 704, 705, 706 and/or 710. Although a series of rollers 702, 703, 704, 705, 706, 707, and 710 are shown in the preferred system, the operation of the present invention does not require that all these rollers be used. For example, only select ones of these rollers may be provided depending on the desired tension and pressure to be applied on sheet S.

Substance 709 is fed into pan 708 by means of a pump (not shown). The level of substance 709 in pan 708 may be controlled by the pump such that the pump automatically feeds more substance 709 to pan 708 whenever substance 709 falls below a certain level. Roller 707 may be submerged in substance 709 up to a desired level depending on the amount of substance 709 needed to be impregnated into sheet S. Roller 707 may be raised or lowered to control the depth to which sheet S is submerged in substance 709 in pan 708 to control the amount of substance 709 impregnated into sheet S. Thus, a greater amount of substance 709 may be impregnated into sheet S by lowering the roller 707. Moreover, the desired amount of substance 709 to be impregnated into sheet S may also be controlled by the pump. Additionally, by controlling the speed of the rollers the amount of time that different parts of sheet S remain submerged in pan 708 may be controlled, thus, further controlling the amount of substance 709 that is applied to different parts of sheet S.

In the preferred embodiment illustrated, sheet S passes around roller 710 which is positioned after roller 707. Metering device 711 preferably located near roller 710 in order to take advantage of the disposition of the surface of sheet S provided thereby, may be used to further control the amount of substance 709 remaining on sheet S. Thus, once sheet S has been impregnated with substance 709 by submergence into pan 708, the amount of substance 709 remaining on sheet S may be further and precisely controlled by metering device 711 to maintain a desired amount of the substance in the sheet. Thus, if desired, metering device 711 may be adjusted, such as by being moved towards roller 710, thereby reducing the amount of substance 709 remaining on sheet S. The excess of substance 709 that is removed from sheet S is preferably caught in pan 708. On the other hand, if desired, the amount of substance 709 remaining on sheet S may be increased by adjusting metering device 711, such as by increasing the distance of metering device 711 from roller 710.

Metering device 711 may be any device capable of precisely controlling the amount of substance 709 that remains in sheet S. In the preferred embodiment, metering device 711 is an air knife which may be used to precisely control the amount of coating material remaining in sheet S by removing excess coating of substance 709 from sheet S. Thus, in the preferred embodiment, metering device 711 comprises a sheet of air projected under pressure at an angle from a slot-shaped air nozzle onto the surface of sheet S. Thus, while sheet S is supported on a moving support such as roller 710, the sheet of air is projected onto sheet S so that the air strikes sheet S at an angle such that a desired amount of substance 709 may be removed from sheet S.

The amount of substance 709 remaining on sheet S may be adjusted by controlling how much air is blown across the surface of sheet S, the force of the air blown across the surface of sheet S, the angle at which the sheet of air strikes the surface of sheet S, and/or the time during which the air knife engages the surface of sheet S, i.e. the speed at which the sheet is moved past the air knife and/or the time transpiring between the application of the substance and the engaging of the air knife. For example, by increasing the distance of metering device 711 from roller 710 the amount of substance 709 remaining in sheet S may be increased due to the striking force of the sheet of air of the preferred embodiment air knife, against the surface of sheet S being reduced. Accordingly, the preferred embodiment includes, a set of screw adjusters which are provided at the end of metering device 711 to adjust its distance from sheet S. However, any means may be used to adjust the distance of the metering device from the surface of sheet S, e.g., a pneumatic mechanical adjuster, an eccentric and follower, an electrically powered adjusting means such as a computer controlled servo mechanism, etc.

Sheet S is then preferably subjected to a B-staging process or other conditioning step to preferably condition substance 709, such as by drying or curing. For this purpose, sheet S may be passed through a conditioner 712. The environment inside conditioner 712 may be controlled such that, if desired, different temperatures, airflow, speed, pressures, catalysts, or the like may be maintained at different points within conditioner 712, to facilitate efficient curing of substance 709. For this purpose, different heating elements, for example, may be provided in different parts of conditioner 712 such that one part of conditioner 712 is more suitable for curing substance 709 and another part of conditioner 712 is more suitable for curing a different substance.

Furthermore, if desired an optimum temperature or other conditioning attribute, which when applied in combination with the precisely controlled application of the coating material according to the present invention, may be calculated such that substance 709 is cured to an acceptable degree. The acceptable degree of curing may be determined based on the ultimate use of sheet S.

Although, conditioner 712 has been described as a single apparatus, a series of apparatus may be used to achieve the desired curing of the substances. The series of apparatus may be a combination of conditioners, refrigerators, wetting devices, drying devices etc. Moreover, it may be desirable to control a combination of conditions, such as the temperature, pressure, moisture level, etc., inside conditioner 712 to achieve a desired result, such as a desired penetration level of sheet S by substance 709.

The embodiment shown in FIG. 2 provides a liquid impermeable layer 21 that prevents the penetration of moisture into the backer laminate. Additionally, the balancing layer 22 of the embodiment shown in FIG. 2, provides the required balancing characteristics to the composite and balances a layer of the decorative side, such as an overlay layer of protective substance, like melamine, by counteracting the pressure exerted by the corresponding layer of the decorative laminate (not shown in the FIGURE), thus preventing warpage of the composite, i.e. causing the composite to remain substantially flat. Moreover, as the layer of protective substance in typical decorative laminates is the outermost surface on the decorative side, it may be desirable to have the balancing layer 22 of the embodiment shown in FIG. 2 as close to the exterior surface as possible on the backer side to more effectively counteract the pressure exerted by the layer of protective substance. As the melamine resin impregnated balancing layer 22 of the embodiment of FIG. 2 is positioned next adjacent to the liquid impermeable layer 21, it is very close to the exterior surface of the laminate and thus provides a desired balancing characteristic to the laminate.

Typically, the thickness of the liquid impermeable layer 21 of FIG. 2 is 5 mils, the thickness of the melamine resin layer 22 varies from 3 mils to 7 mils, and the thickness of the phenolic resin impregnated kraft paper 23 varies from 7 mils to 11 mils. Therefore, in the embodiment of the present invention as shown in FIG. 2, the thickness of the backer laminate typically varies from 15 mils to 23 mils. However, in some applications it may be desirable to have backers of thickness less than 15 mils.

Figure 3:
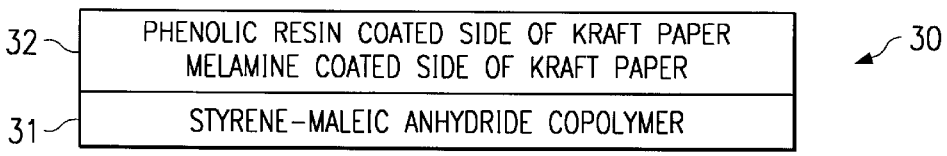
FIG. 3 is a schematic of a backer in accordance with a second embodiment of the present invention.

Therefore, an alternative embodiment of the present invention as shown in FIG. 3, comprises a laminate material 32, such as a kraft paper sheet, treated with a substance providing desired characteristic, such as a balancing substance, like melamine, on one side, and a same or different substance providing another desired characteristic, such as a substance providing structural characteristics, like phenolic resin, on the other side. A system and method for providing such a laminate material has been shown and described in the above referenced commonly assigned U.S. Patent Application, entitled "SYSTEM AND METHOD FOR TWO SIDED SHEET TREATING", the disclosure of which is hereby incorporated herein by reference.

In the embodiment shown in FIG. 3, laminate 30 includes from the bottom up a liquid impermeable layer 31, such as a styrene-maleic anhydride copolymer layer, and a laminate material 32, such as a kraft paper sheet, treated with melamine resin on one side and phenolic resin on the other side. In the embodiment of FIG. 3, the melamine resin treated side of the kraft paper sheet 32 faces the liquid impermeable layer 31, as the melamine in layer 32 has been adapted, as described above with reference to FIG. 2, to provide superior bonding characteristics with the styrene-maleic anhydride copolymer layer 31. The liquid impermeable layer 31 provides a first desired characteristics to the laminate, such as making the laminate substantially moisture resistant. The melamine/phenolic resin impregnated kraft paper 32 provides both a desired balancing characteristic and a desired structural characteristic to the laminate.

Typically the thickness of liquid impermeable layer 31 of FIG. 3 is 5 mils and the thickness of the melamine/phenolic resin impregnated kraft paper 32 varies from 7 mils to 11 mils depending on the type of kraft paper used. Thus the thickness of the backer laminate may vary from 12 mils to 16 mils depending on the thickness of the liquid impermeable layer 31, and the thickness of the melamine/phenolic resin impregnated kraft paper layer 32. The ratio of phenolic resin and melamine resin in kraft paper 32 may be changed to increase the balancing characteristic of the sheet, as shown in the above referenced U.S. Patent Application, entitled "SYSTEM AND METHOD FOR TWO SIDED SHEET TREATING".

In this embodiment of the present invention, the thickness of the backer is less than the thickness of the backer shown in the embodiment of FIG. 2. Moreover, like the embodiment of FIG. 2, the backer laminate of FIG. 3 allows two layers providing desired characteristics which do not naturally bond together to be placed adjacent to each other while providing a desired bonding.

The embodiment of the present invention as shown in FIG. 3 provides the desired characteristics, such as impermeability to liquids and balancing characteristics, to the laminate in cases where the number of protective layers on the decorative side is one. However, this embodiment may not provide adequate balancing characteristics, in other cases, for example, when the number of protective layers on the decorative side is more than one, such as in commercial or other high wear applications which require greater abrasion resistance. In such cases, the total melamine on the combined protective layers in the decorative side is very strong and has an increased tendency to pull the laminate in the upward direction causing positive warping. This effect is especially pronounced under dry and low humidity conditions. Thus, it may be desirable to have a greater amount of the balancing substance in the backer or balancing side of the laminate to counteract the movement of the additional protective layers.

Figure 4:
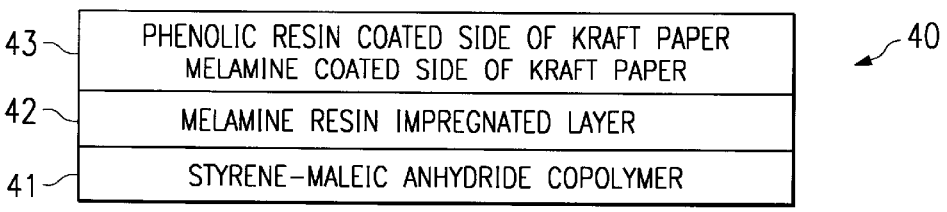
FIG. 4 is a schematic of a backer in accordance with a third embodiment of the present invention.

Therefore, in the embodiment shown in FIG. 4, an additional layer 42 of a laminate material, such as a traditional overlay sheet, impregnated with a substance providing a desired characteristic, such as a balancing substance, like melamine is included in the backer laminate. Laminate 40 of the embodiment of FIG. 4 includes from the bottom up a liquid impermeable layer 41, such as a styrene-maleic anhydride copolymer layer, a laminate material 42, such as a traditional overlay sheet, impregnated with melamine resin, and another laminate material 43, such as a kraft paper sheet, treated with melamine resin on one side and phenolic resin on the other side. In the embodiment of FIG. 4, the liquid impermeable layer 41 provides a first desired characteristic to the laminate, such as making the laminate substantially moisture resistant. The melamine resin impregnated layer 42 is disposed next adjacent to the liquid impermeable layer 41, as it is desirable to have the melamine layer close to the exterior surface of the backer to balance the protective layer of the decorative side. The kraft paper sheet 43 may be disposed adjacent to the laminate material 42, with the melamine side of kraft paper sheet 43 next adjacent to the melamine impregnated laminate material 42. In the embodiment shown in FIG. 4, if desired, the phenolic layer of kraft paper sheet 43 may be adjacent to a substrate (not shown in the FIGURE), such as a traditional wood-based substrate or a non-wood based substrate such as described in the above referenced U.S. Patent Application, entitled "POLYMERIC FOAM COMPOSITIONS AND METHOD OF MAKING, SUBSTRATES MADE FROM SUCH COMPOSITIONS AND METHOD OF MAKING, PRODUCTS MADE FROM SUCH SUBSTRATES AND METHOD OF MAKING", to allow bonding of the backer laminate with the substrate.

Typically the thickness of the liquid impermeable layer 41 of FIG. 4 is 5 mils, the thickness of the melamine layer 42 varies from 3 mils to 7 mils, and thickness of the melamine/phenolic resin impregnated kraft paper 43 varies from 7 mils to 11 mils depending on the type of kraft paper used. It is desirable that the laminate of the embodiment of FIG. 4 have more melamine than the laminate of the embodiment of FIG. 3 in order to properly balance the multiple protective layers on the decorative side and to keep the composite flat. Prior art backers use special overlay type sheets that are impregnated with melamine resin. However, the kraft paper sheet with phenolic resin on one side and melamine resin on the other side has been adapted to be able to incorporate a desired amount of melamine as discussed in the above referenced U.S. Patent Application, entitled "SYSTEM AND METHOD FOR TWO SIDED SHEET TREATING". Thus, the kraft paper sheet may incorporate a greater amount of melamine than is possible in an overlay sheet. Although in the preferred embodiment, only half of the kraft paper is impregnated with melamine, the amount of the melamine in layer 43 may be increased depending on the particular application and in most cases is equal to or greater than the amount impregnated into a traditional overlay sheet. Thus, an advantage of the embodiment as illustrated in FIG. 4, is that as the kraft paper provides more resin per sheet than a traditional overlay sheet impregnated with melamine resin, a greater amount of the balancing substance is included in the backer laminate. Furthermore, in the embodiment of FIG. 4, an additional layer of melamine resin impregnated laminate material is being used to provide better balancing characteristics, such as by providing more strength and stiffness, to balance the multiple protective layers of the decorative side. Thus, in this embodiment, the flatness of the composite is maintained under both high and low humidity conditions due to the heavy concentration of melamine in the backer laminate.

Additionally, if desired only the melamine in the melamine resin impregnated layer 42 may be adapted with an adhesion promoting agent, such as silane, to provide the desired bonding with the liquid impermeable layer 41 as melamine resin does not naturally provide the desired bonding with the liquid impermeable layer. It is not desirable to adapt the melamine (with an adhesion promoting agent) used in the melamine/phenolic layer 43 as the melamine in the melamine/phenolic layer 43 bonds easily with melamine in layer 42. This would result in cost savings as the amount of silane desirable to be mixed with melamine is reduced. However, if desired, the melamine in both layers 42 and 43 may be adapted with silane. Furthermore, the laminate so produced is moisture resistant and does not warp in flooding or sitting water due to the presence of the liquid impermeable layer 41.

Although the embodiment of FIG. 4 has been described with the melamine side of kraft paper 43 facing the melamine impregnated layer 42, in alternative embodiments kraft paper 43 may be inverted so that the phenolic side of kraft paper 43 faces the melamine side of kraft paper 42 to give a balanced laminate.

Figure 5:
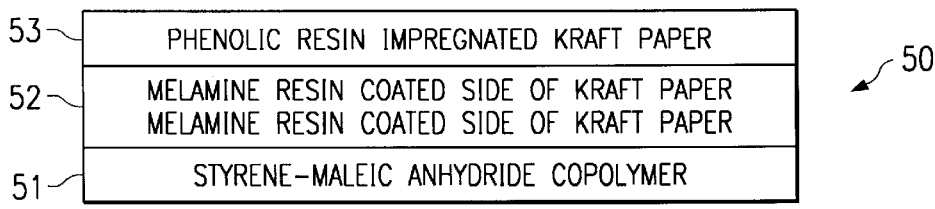
FIG. 5 is a schematic of a backer in accordance with a fourth embodiment of the present invention.

FIG. 5 shows an alternate embodiment of the laminate of the embodiment of the present invention illustrated in FIG. 4 in which the melamine impregnated layer 42 of FIG. 4 has been substituted with a laminate material 52 coated with melamine on both sides, and the melamine/phenolic layer 43 has been substituted with a phenolic resin impregnated kraft paper sheet 53. Laminate 50 of the illustrated embodiment of FIG. 5 includes from the bottom up a liquid impermeable layer 51, a laminate material 52, such as a kraft paper sheet, coated with melamine resin on both sides, and another laminate material 53, such as a kraft paper sheet, impregnated with phenolic resin. In the embodiment of FIG. 5, the melamine/melamine layer 52 is disposed adjacent to liquid impermeable layer 51 as it is desirable to have the melamine layer close to the exterior of the laminate in order to balance the protective layer which forms the exterior surface of the decorative side. The melamine on the surface of layer 52 facing the liquid impermeable layer 51 may be adapted to provide a desired bonding with the liquid impermeable layer 51. As discussed above, this may be accomplished by mixing an adhesion promoting agent, such as silane, in melamine resin using the method described above preferably prior to treating the laminate material with melamine preferably using the method described in the above referenced U. S. Patent Application, entitled "SYSTEM AND METHOD FOR TWO SIDED SHEET TREATING". Moreover, it is not critical to adapt the melamine that is coated on the side of laminate material 52 facing the phenolic resin impregnated kraft paper 53 as the phenolic resin impregnated kraft paper 53 would bond easily with the adjacent melamine coated side of kraft paper 52. In alternative embodiments, the additional layer 53 may be impregnated with other resins or may be eliminated without departing from the spirit of the present invention.

The two sided coated sheet 52 treated with the same substance, such as melamine, on both sides, as discussed above, eliminates the need to use overlay type sheets impregnated with melamine in order to balance the melamine resin impregnated overlay type sheets of the decorative side. Typically the overlay type sheets are more expensive than the kraft paper sheet. Thus, an advantage of the embodiment of FIG. 5 of the present invention is that the cost of producing the liquid impermeable laminates is reduced. Furthermore, the amount of the balancing substance may be controlled depending on the amount desirable to balance the overlay type melamine impregnated sheet or sheets of the decorative side. Thus, the amount of the impregnated melamine may be increased or reduced depending on the particular application. Moreover, the amount of adhesion promoting agent, such as silane, used may be adjusted so that less than a determined percentage, such as for example 50%, of the total melamine content of kraft paper sheet 52 contains the adhesion promoting agent.

Figure 6:
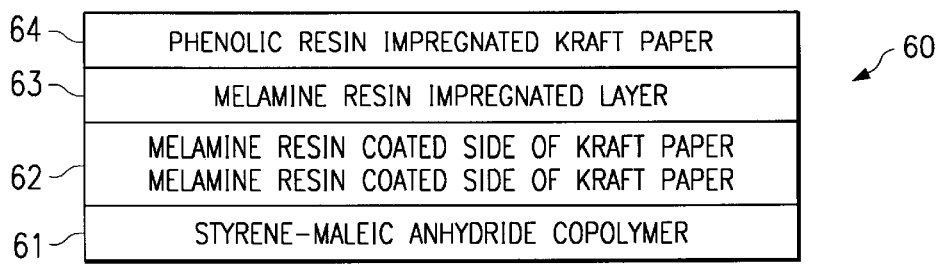
FIG. 6 is a schematic of a backer in accordance with a fifth embodiment of the present invention.

FIG. 6 shows an alternate embodiment of the laminate of the present invention illustrated in FIG. 5 in which an additional layer of laminate material, such as an overlay sheet, impregnated with a substance providing a desired characteristic, such as melamine resin, is introduced preferably between the melamine/melamine layer 52 of FIG. 5 and the phenolic resin impregnated kraft paper 53 of FIG. 5. Thus, laminate 60 of the illustrated embodiment of FIG. 6 includes from the bottom up a liquid impermeable layer 61, such as a styrene-maleic anhydride copolymer layer, a laminate material 62, such as a kraft paper, coated with melamine resin on both sides, and another laminate material 63, such as a melamine resin impregnated overlay sheet. In alternative embodiments, any sheet suitable for impregnation with a resin, such as a melamine resin, may be used as laminate material 63. In the embodiment of FIG. 6, the melamine/melamine layer 62 is disposed adjacent to the liquid impermeable layer 61 as it is desirable to have the melamine layer close to the exterior surface of the laminate in order to balance the protective layer which forms the exterior surface of the decorative side. The melamine on the side of layer 62 facing the liquid impermeable layer 61 may be adapted to provide a desired bonding with the liquid impermeable layer 61. Moreover, it is not necessary to adapt the melamine that is coated on the side of the laminate material 62 facing the melamine resin impregnated layer 63 as the melamine resin impregnated layer 63 would bond easily with the adjacent melamine coated side of the kraft paper 62. If desired, one or more layers of kraft paper 64 impregnated with phenolic resin may be disposed on top of layer 63. In alternative embodiments, the additional layer 64 may be impregnated with other resins or may not be present without departing from the spirit of the present invention.

Thus, one can conceive of any combination of laminate configurations in which the liquid impermeable layer, such as a styrene-maleic anhydride copolymer layer, is the outermost sheet. The liquid impermeable layer may be followed by a combination of any desirable number of sheets of melamine, double treated melamine/melamine sheets, or double treated melamine/phenolic sheets in any order, such that a melamine layer is next adjacent to the styrene-maleic anhydride copolymer layer and the melamine resin next adjacent to the styrenemaleic anhydride copolymer layer contains a silane coupling agent. Moreover, a desired number of phenolic resin impregnated kraft paper sheets may be positioned in between the melamine sheets or the double treated sheets. Furthermore, phenolic resin impregnated kraft paper sheets may also be positioned after the melamine (and/or double treated) sheets, such that the melamine (and/or double treated) sheets are between the styrene-maleic anhydride copolymer sheet and the phenolic sheets.

Experimentation has revealed that the embodiments of the laminates of the present invention as discussed above provide improved balancing characteristics. The effect of the addition of the melamine balancing sheet to the backer laminate is shown in the table of FIG. 8. In conducting the experiment, two 7'×5' floors were installed over a particle board subfloor set-up in an environmentally controlled chamber. The panels making up each floor were bonded together using urethane adhesive. The first flooring 1 employed a backer laminate comprising a layer of styrene-maleic anhydride copolymer and three sheets of 140 lb kraft paper impregnated with phenolic resin. The second flooring 2 employed a backer laminate, comprising a layer of styrene-maleic anhydride copolymer, one sheet of overlay material treated with silane and melamine, and three sheets of 140 lb kraft paper treated with phenolic resin. Both floors employed identical substrate and decorative laminates. The warpage of each flooring plank was measured across the 7' length at installation, after wet conditioning and after dry conditioning. The installed, wet and dry warpage of the different flooring panels is shown in the table of FIG. 8. The average value of all planks for each floor is given in the last row of the table of FIG. 8. In the table of FIG. 8, a negative value indicates that the flooring panel is curved downward toward the subfloor. A positive value indicates that the flooring panel is curved upward away from the subfloor. All values are denoted in inches.

The specific conditioning program for the flooring samples is outlined as follows. The temperature inside the humidity chamber was maintained at 70° F. and the relative humidity maintained at 50% from 9 a.m. to 11 a.m. At 11 a.m., a cycling process was started inside the humidity chamber in which the temperature and humidity were changed twice. The temperature and relative humidity inside the chamber was changed first to 90° F., 90% rH (hot and wet conditions) at 11 a.m. and maintained until 5 p.m. and changed to 90° F., 10% rH (hot and dry conditions) at 5 p.m. and maintained until 8 a.m. the next day.

It was observed that panels of flooring 1 comprising of the styrene-maleic anhydride copolymer layer and three phenolic resin layers demonstrated less negative warping when installed, as indicated by the values in the "INSTALLED" column in the table of FIG. 8. On the other hand, panels of flooring 2 comprising of a styrene-maleic anhydride copolymer layer, the silane adapted melamine treated overlay layer, and the three phenolic resin layers, demonstrated more negative warping when installed. As the flooring panels were conditioned at high temperature and high humidity, such as from 11 a.m. to 5 p m., the exposed melamine overlay layer (the protective layer) on the exterior of the decorative side of the flooring composite had a tendency to absorb water and swell the panels slightly. This swelling of the top laminate panel forces the panels of the flooring downward causing increased negative warpage, as indicated by the values in the "WET" column in the table of FIG. 8. As the flooring panels are subsequently conditioned at high temperature and low humidity, such as from 5 p.m. to 8 a.m. the next day, the exposed melamine of the decorative side of the panels dries out and shrinks. It was observed that the panels of flooring 1 with no balancing layer demonstrated more positive warping as compared to panels of flooring 2 comprising of the balancing and liquid impermeable layers disposed adjacent to each other, as indicated in the "DRY" column in the table of FIG. 8. Positive warpage of the composite is undesirable as the seams between the planks lift upward becoming visually unpleasant. This gives the impression that the seems between the flooring planks are opening, and thus, hurts the appearance of the surface. Flooring composite 1 demonstrated more positive warpage as compared to flooring composite 2. Moreover, the positive cupping of flooring 1 was physically observable, whereas the negative cupping of flooring 2 was not visible. Thus, it should be clear that laminates utilizing a liquid impermeable layer and a balancing layer adjacent to each other, as discussed above, provide improved balancing characteristics.

As mentioned above, flooring composite 2, comprising the backer of the embodiment of FIG. 2 of the present invention, demonstrated more and consistent negative warping on or before installation than flooring 1. Accordingly, the flooring, or other laminates, manufactured according to a preferred embodiment of the present invention may be produced to result in products with consistent negative warping. Negative warping is not generally noticeable to the casual observer and is perceived as being flat. However, in contrast, even small amounts of positive warping seem to be detectable under typical circumstances in which laminated products are installed. Moreover, under severe environmental conditions, laminated products having an exposed melamine surface tend to warp in the positive direction over time.

Accordingly, providing a consistent but small amount of negative warpage in the natural state of the product may be relied upon to counteract such later positive warping and thereby provide a superior product as the observable positive warping may be avoided or eliminated. In a preferred embodiment, therefore, an amount of the balancing substance, such as melamine, is determined which, due to its characteristics, provides the aforementioned initial negative warping in a laminate. For example, using two layers of melamine balancing material has been found to provide the consistent and slight negative warping described above.

The different embodiments of the present invention as discussed above are considered to be exemplary of laminates that may be used in accordance with the present invention. Different embodiments of the present invention may be used as decorative and/or backer type laminates without departing from the scope of the present invention. For example, decorative layers may take various forms and employ laminate layers in a variety of combinations. As such, the layers of the backer laminate may be varied to complement changes in the decorative layer without departing from the spirit of the present invention. Moreover, the liquid impermeable layer and the balancing layer of the present invention as discussed above may be used in the decorative layer or the backer layer without corresponding use of a substrate, if desired. For example, a panel having a liquid impermeable layer on one or all sides and a balancing layer adjacent to the liquid impermeable layer may be utilized in any of a number of orientations to provide a surface which is liquid impermeable and does not warp, where a substrate may not be desired.

The prior art laminates use wood based materials such as plywood, particle board, chipboard, medium density fiberboard, high density fiberboard, etc. as substrate. Although the different embodiments of the present invention as discussed above may be used with any kind of substrates, such as wood based and non-wood based substrates, the present invention is especially useful for use with substrates made from Alternate Substrate Materials (ASM). Such ASM may include non-wood cores or substrates, such as synthetic or non-cellulose substrate material, for example, recycled plastic substrates, ABS/PC, nylon, PVC, polystyrene, any olefins, or like materials alone or in combination with like or unlike materials, such as calcium carbonate, magnesium hydroxide, talc, clays, glass fiber, carbon fibers, fire retardants, smoke suppressors, wollastonite, if desired. The lack of stiffness of the non-wood based substrates makes the use of different embodiments of the laminates as discussed above more desirable to provide the desired characteristics, such as strength and balancing, to the laminates than the traditional laminates using wood based substrates.

In the different embodiments of the present invention as discussed above, the substance used in the layer providing the second desired characteristic, such as melamine, has been adapted to provide the desired bonding with the layer providing the first desired characteristics, such as the preferred embodiment liquid impermeable layer. However, the invention is not so limited and in alternative embodiments, the layer providing the first desired characteristic may be adapted to provide the desired bonding. For example, in an alternative embodiment, the liquid impermeable layer itself may be treated with an adhesion enhancing substance, such as silane, to provide the desired bonding with the layer providing the second desired characteristics, such as the melamine resin impregnated balancing layer. In one embodiment, the layer providing the first desired characteristic, such as the liquid impermeable layer, may be immersed in a bath of silane, such that the surface of the liquid impermeable layer is treated with silane, which would then provide bond sites for bonding with the substance in the layer providing the second desired characteristics.

Moreover, although in the preferred embodiment, the substance providing the second desired characteristics, such as melamine, is adapted prior to treating a laminate material, the invention is not so limited and in alterative embodiments, melamine may be treated with silane after treating the laminate material. For example, in another embodiment of the present invention, the laminate material may be treated with melamine resin first to provide the desired balancing characteristics and then treated with an adhesion enhancing agent, such as silane, to promote bonding with a layer providing liquid impermeable characteristics to the laminate.

Moreover, more than two sheets of laminate material coated with a substance, providing a desired characteristic, on one side and a different or same substance, providing a desired characteristic, on the other side may be used, without departing from the spirit of the present invention. Additionally, the various layers may be used to provide characteristics or functions different from those described above. Thus, the present invention may be used to provide a structure with good bonding having desired characteristics even when materials having these characteristics do not readily bond.

It shall be appreciated by those skilled in the art, that although the embodiments of the present invention have been described above with regard to a liquid impermeable layer and a balancing layer, the invention is not so limited and the teachings of the present invention may be used in any situation where it is desirable to have two substances adjacent to each other and the two substances are incapable of adhering to each other. Moreover, although the exemplary embodiments have been discussed with regard to backer laminates, the present invention may be used for the decorative side of the laminates.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A laminate for use in an end product, comprising:
   a first thermoplastic layer providing a first desired characteristic to said end product; and
   a second resin treated layer providing a second desired characteristic to said end product, wherein said resin of said second layer has been adapted with a first substance to provide enhanced adhesion of said second layer with said first layer, thereby allowing the disposition of said first and second layers adjacent to each other,
   wherein said resin is melamine resin which balances a second substance in a third layer of said end product.

2. The laminate of claim 1, wherein said first desired characteristic in said end product is a liquid resistant characteristic.

3. The laminate of claim 1, wherein said first thermoplastic layer is a styrenemaleic anhydride copolymer layer which substantially prevents the penetration of moisture into said end product.

4. The laminate of claim 1, wherein said second desired characteristic in said end product is consistent with characteristics of a third layer of said end product.

5. The laminate of claim 1, wherein said first substance is an adhesion promoting agent.

6. The laminate of claim 1, wherein said first substance is silane.

7. The laminate of claim 1, wherein an amount of said first substance in said second resin treated layer is selected to provide a desired adhesion of said first and second layers.

8. The laminate of claim 1, wherein said first substance is silane and an amount of silane in said second resin treated layer is between 0.1 to 0.5 percent by weight of said resin.

9. The laminate of claim 1, further comprising:
   a phenolic resin impregnated kraft paper sheet positioned adjacent to said second layer.

10. The laminate of claim 1, wherein said end product is selected from the group consisting of a flooring panel, a counter top, a table top, an exterior wall, an interior wall, a siding, a roof top, a facade boarding, and a work top.

11. The laminate of claim 1, wherein said second resin treated layer is a kraft paper sheet coated with said first substance adapted resin on one side and phenolic resin on the other side, wherein said phenolic resin coated side of said kraft paper sheet faces away from said first thermoplastic layer.

12. The laminate of claim 1, wherein said resin adapted with said first substance is coated on a first surface of a first laminate material and phenolic resin is coated on an opposing surface of said first laminate material to provide structural characteristics to said laminate.

13. The laminate of claim 12, wherein said first laminate material is a kraft paper sheet.

14. The laminate of claim 12, wherein said first laminate material is positioned adjacent said first thermoplastic layer with the phenolic resin coated surface of said laminate material facing away from said first thermoplastic layer.

15. The laminate of claim 1, further comprising:
    a second laminate material coated with melamine resin and phenolic resin on opposing surfaces.

16. The laminate of claim 15, wherein said second laminate material is positioned adjacent to said second layer with the melamine resin coated surface of said second laminate material facing said second resin treated layer.

17. The laminate of claim 1, wherein said second resin treated layer is a third laminate material coated with melamine resin on a first surface and said resin adapted with said first substance on a second surface.

18. The laminate of claim 17, wherein said third laminate material is positioned adjacent said first thermoplastic layer with the adapted resin coated surface of said third laminate material adjacent said first thermoplastic layer.

19. The laminate of claim 18, further comprising:
    a phenolic resin impregnated kraft paper sheet positioned adjacent said unadapted melamine resin coated surface of said third laminate material.

20. The laminate of claim 18, further comprising:
    a fourth laminate material impregnated with melamine resin positioned adjacent said unadapted melamine resin coated surface of said third laminate material.

21. The laminate of claim 20, further comprising:
    a fifth kraft paper sheet impregnated with phenolic resin positioned adjacent said fourth laminate material.

22. The laminate of claim 17, wherein said third laminate material is a sheet suitable for saturation with a resin.

23. The laminate of claim 4, further comprising:
    a decorative layer positioned adjacent to said third layer between said third layer and said second layer.

24. The laminate of claim 23, further comprising:
    a substrate positioned between said decorative layer and said second layer.

25. The laminate of claim 24, wherein said substrate is a non-wood based substrate.

26. The laminate of claim 24, wherein said substrate is a wood based substrate.

27. The laminate of claim 1, wherein said first and second substances are desired to be disposed in said laminate at a same desired strata.

28. A panel, comprising:
    a first layer of a protective substance to protect said panel from external factors;
    a second layer of a substance providing liquid impermeable characteristics; and
    a third layer of a balancing substance, wherein said third layer balances said first layer of said protective substance, wherein said third layer is positioned adjacent to said second layer between said first and second layers, and wherein said balancing substance has been adapted to provide a desired adhesion between said second and third layers,
    wherein said balancing substance is melamine resin.

29. The panel of claim 28, wherein said adaptation of said balancing substance comprises mixing a predetermined amount of an adhesion promoting agent in said balancing substance.

30. The panel of claim 29, wherein said adhesion promoting agent is silane.

31. The panel of claim 28, wherein said adaptation of said balancing substance comprises mixing approximately 0.1 to 0.5 percent by weight of an adhesion promoting agent in said balancing substance.

32. The panel of claim 28, further comprising:
a fourth layer of a substance providing structural characteristics, wherein said fourth layer is positioned between said first layer and said third layer.

33. The panel of claim 29, further comprising:
a substrate positioned between said first layer and said fourth layer.

34. The panel of claim 29, wherein said substrate is a non-wood based substrate.

35. The panel of claim 29, further comprising:
a fifth layer of said protective substance to provide enhanced protective characteristics to said flooring panel, and wherein said fifth layer is positioned between said first layer and said substrate.

36. The panel of claim 35, further comprising:
a sixth layer of said balancing substance to provide enhanced balancing characteristics to said panel, wherein said sixth layer is positioned between said third layer and said fourth layer.

37. The panel of claim 36, wherein said sixth layer of balancing substance and said fourth layer of substance providing said structural characteristic are coated on opposing surfaces of a kraft paper sheet.

38. The panel of claim 36, wherein said third layer of balancing substance and said sixth layer of balancing substance are coated on opposing surfaces of a kraft paper sheet.

39. The panel of claim 38, further comprising:
a seventh layer of said balancing substance, wherein said seventh layer is positioned between said fourth layer and said sixth layer, wherein said seventh layer provides a desired negative warping to said laminate.

40. The panel of claim 28, wherein said protective substance is melamine resin.

41. The panel of claim 28, wherein said second layer is a styrene-maleic anhydride copolymer layer which provides a desired liquid impermeable characteristic to said panel.

42. The panel of claim 28, further comprising:
an eighth decorative layer positioned adjacent to said first layer to provide a desired decorative surface to said panel; and
a ninth layer of phenolic resin impregnated kraft paper, wherein said eighth decorative layer is positioned between said first layer and said third layer, and said ninth layer is positioned between said eighth layer and said third layer.

43. A panel, comprising:
a first layer of a protective substance to protect said panel from external factors;
a second layer of a substance providing liquid impermeable characteristics; and
a third layer of a balancing substance, wherein said third layer balances said first layer of said protective substance, wherein said third layer is positioned adjacent to said second layer between said first and second layers, and wherein said balancing substance has been adapted to provide a desired adhesion between said second and third layers,
wherein said protective substance is melamine resin.

44. The panel of claim 43, wherein said adaptation of said balancing substance comprises mixing a predetermined amount of an adhesion promoting agent in said balancing substance.

45. The panel of claim 44, wherein said adhesion promoting agent is silane.

46. The panel of claim 43, wherein said adaptation of said balancing substance comprises mixing approximately 0.1 to 0.5 percent by weight of an adhesion promoting agent in said balancing substance.

47. The panel of claim 43, further comprising:
a fourth layer of a substance providing structural characteristics, wherein said fourth layer is positioned between said first layer and said third layer.

48. The panel of claim 44, further comprising:
a substrate positioned between said first layer and said fourth layer.

49. The panel of claim 44, wherein said substrate is a non-wood based substrate.

50. The panel of claim 44, further comprising:
a fifth layer of said protective substance to provide enhanced protective characteristics to said panel, and wherein said fifth layer is positioned between said first layer and said substrate.

51. The panel of claim 50, further comprising:
a sixth layer of said balancing substance to provide enhanced balancing characteristics to said panel, wherein said sixth layer is positioned between said third layer and said fourth layer.

52. The panel of claim 51, wherein said sixth layer of balancing substance and said fourth layer of substance providing said structural characteristic are coated on opposing surfaces of a kraft paper sheet.

53. The panel of claim 51, wherein said third layer of balancing substance and said sixth layer of balancing substance are coated on opposing surfaces of a kraft paper sheet.

54. The panel of claim 53, further comprising:
a seventh layer of said balancing substance, wherein said seventh layer is positioned between said fourth layer and said sixth layer, wherein said seventh layer provides a desired negative warping to said laminate.

55. The panel of claim 43, wherein said second layer is a styrene-maleic anhydride copolymer layer which provides a desired liquid impermeable characteristic to said panel.

56. The panel of claim 43, further comprising:
an eighth decorative layer positioned adjacent to said first layer to provide a desired decorative surface to said panel; and
a ninth layer of phenolic resin impregnated kraft paper, wherein said eighth decorative layer is positioned between said first layer and said third layer, and said ninth layer is positioned between said eighth layer and said third layer.

* * * * *